US008883102B1

(12) United States Patent
Lambert et al.

(10) Patent No.: US 8,883,102 B1
(45) Date of Patent: Nov. 11, 2014

(54) METHODS FOR CONTROLLING NITROUS OXIDE EMISSIONS

(71) Applicant: Ford Global Technologies, LLC, Dearborn, MI (US)

(72) Inventors: Christine Kay Lambert, Dearborn, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/155,255

(22) Filed: Jan. 14, 2014

(51) Int. Cl.
*B01D 53/94* (2006.01)
*F01N 3/10* (2006.01)
*F01N 3/18* (2006.01)
*F01N 3/20* (2006.01)

(52) U.S. Cl.
CPC ........ *B01D 53/9495* (2013.01); *B01D 53/9418* (2013.01)
USPC .................. 423/213.2; 423/213.5; 423/213.7; 60/274; 60/299; 60/300; 60/301

(58) Field of Classification Search
USPC ........... 423/213.2, 213.5, 213.7; 60/299, 301, 60/274, 300
See application file for complete search history.

(56) References Cited

U.S. PATENT DOCUMENTS 5,997,830 A * 12/1999 Itoh et al. ................... 423/213.5
6,125,801 A   10/2000 Mendler
8,322,472 B2  12/2012 Gonze
8,512,658 B2 *  8/2013 Eckhoff et al. ............. 423/213.2
8,695,329 B2 *  4/2014 Mussmann et al. ............. 60/295
2008/0282673 A1 11/2008 Gonze
2012/0073273 A1 *  3/2012 Asanuma et al. ............... 60/299
2013/0239552 A1 *  9/2013 Gonze et al. .................... 60/276
2013/0343975 A1 * 12/2013 Reichinger et al. ........ 423/213.2
2014/0065044 A1 *  3/2014 Ito et al. ..................... 423/213.5

FOREIGN PATENT DOCUMENTS

EP         1012461 B1   8/2010

OTHER PUBLICATIONS

Laing, P., "Development of an Alternator-Powered Electrically-Heated Catalyst System," SAE Technical Paper Series No. 941042, International Congress & Exposition, Detroit, MI., Feb. 28-Mar. 3, 1994,10 pages.
Presti, M. et al., "An Alternative Way to Reduce Fuel Consumption During Cold Start: The Electrically Heated Catalyst," SAE International Paper No. 2011-24-0178, 2011, 8 pages.
Kim, C. et al., "Electrically Heated Catalysts for Cold-Start Emissions in Diesel Aftertreatment," SAE International Paper No. 2012-1-1092, Published Apr. 16, 2012, 10 pages.

(Continued)

*Primary Examiner* — Timothy Vanoy
(74) *Attorney, Agent, or Firm* — Julia Voutyras; Alleman Hall McCoy Russell & Tuttle LLP

(57) ABSTRACT

Systems and methods for controlling nitrous oxide emissions are described. In one particular example, nitrous oxide formed in the exhaust system of a diesel hybrid vehicle is routed through an oxidation catalyst heated by an external source such as an electric heater. Then, the catalyst is heated from the external source to reduce nitrous oxide formation within the exhaust system by increasing the catalyst temperature above a temperature range associated with nitrous oxide generation.

20 Claims, 10 Drawing Sheets

(56) References Cited

OTHER PUBLICATIONS

Kurre, S. et al., "Effect of Compression Ratio on Diesel Engine Performance and Emission with Diesel-Ethanol Blends," International Journal of Scientific & Engineering Research Paper No. 2229-5518, vol. 4, Issue 10, Oct. 2013, 5 pages.

"DieselNet: Diesel Engine Emissions Online," DieselNet, http://www.dieselnet.com/, 2 pages, Accessed Feb. 4, 2014.

Lambert, C. et al., "Nitrous Oxide Emissions From a Medium-Duty Diesel Truck Exhaust System," International Journal of Powertrains, vol. 3, No. 1, 2014, pp. 4-25, 22 pages.

* cited by examiner

METHODS FOR CONTROLLING NITROUS OXIDE EMISSIONS

FIELD

The field of the disclosure relates to controlling emissions from engines in particular hybrid-diesel powertrains.

BACKGROUND

Federal regulations of HC, CO and NOx have been in place for some time. Only recently has regulation of so called greenhouse gases, in particular $CO_2$, been proposed. $CO_2$ is directly related to fuel economy and engine efficiency and does not require any additional emission devices. Regulation of $N_2O$, another alleged greenhouse gas, which has recently been proposed, presents new issues.

The inventors herein have recognized that $N_2O$ is most likely to be created in the low temperature exhaust gas aftertreatment systems of diesel engines and hybrid-diesel engines in particular. In such aftertreatment systems, an oxidation catalyst or DOC is placed in the engine exhaust to oxidize HC and CO over a catalytic surface typically containing precious metals such as platinum and palladium. A selective reduction base metal catalyst, or SCR, is placed downstream of the DOC and connected to an ammonia injection system which uses an ammonia-based reductant such as aqueous urea that is injected under certain engine operating conditions to chemically reduce NOx with ammonia.

More specifically, the inventors have recognized that HC from the engine may react with NOx in the DOC to produce $N_2O$ when the DOC is operating in a temperature window sufficiently high for the reaction to occur but sufficiently low such that not all the HC is oxidized. If diesel fuel is used to heat the DOC, then even more $N_2O$ would be produced with the additional HC. Another $N_2O$ reaction may occur in the SCR by reacting ammonia with NOx.

In one particular aspect of the invention, the inventors have addressed the issue of $N_2O$ generation in a method where exhaust gases from the engine are routed through an oxidation catalyst which includes a washcoat with palladium or platinum or both. $N_2O$ formation from the oxidation catalyst is inferred from one or more of, temperature of the catalyst, ratio of HC to NOx or ratio of $NO_2$ to NOx in the engine exhaust gases; and reducing the $N_2O$ formation when the catalyst is operating within a temperature window associated with $N_2O$ formation. In a further aspect, the $N_2O$ formation is reduced by heating the catalyst from an external source. In this way, the technical result is achieved, and the catalyst is preferably heated by an electric heater and the heating ends when the catalyst temperature rises above a temperature range associated with $N_2O$ generation.

In still a further aspect, the reducing of $N_2O$ formation comprises increasing the effective compression ratio of the engine to reduce HC formation by the engine when the inferred $N_2O$ formation exceeds a predetermined value. The engine compression ratio increase comprises at least one of the following: changing intake valve timing of the engine, increasing pressure of air forced into the engine, or decreasing volume of combustion chambers of the engine.

In another aspect of the invention, the method includes routing exhaust gases from the engine through an oxidation catalyst which includes a washcoat with palladium or platinum or both; routing exhaust gases from the oxidation catalyst into a selective reduction catalyst; adding ammonia to the selective reduction catalyst under predetermined conditions to reduce NOx; inferring $N_2O$ formation from the oxidation catalyst from, temperature of the oxidation catalyst, HC and NOx and $NO_2$ in the engine exhaust gases; inferring $N_2O$ out of the selective reduction catalyst from temperature of the selective reduction catalyst, the inferred $N_2O$ formation from the oxidation catalyst, and the ammonia; and heating the oxidation catalyst from an external source to reduce the $N_2O$ out of the selective reduction catalyst when the oxidation catalyst temperature is below a predetermined range and the $N_2O$ out of the selective reduction catalyst exceeds a preselected amount. Preferably, the inferred $N_2O$ from the oxidation catalyst is inferred from temperature of the oxidation catalyst, and the ratio of HC to NOx and the ratio of $NO_2$ to NOx in the exhaust gases.

In still another aspect the invention is applied to a hybrid-diesel engine. In this aspect the method practiced comprises: routing exhaust gases from the engine through an oxidation catalyst which includes a washcoat with palladium or platinum or both; routing exhaust gases from the oxidation catalyst into a selective reduction catalyst; adding ammonia to the selective reduction catalyst under predetermined conditions to reduce NOx; inferring $N_2O$ formation from the oxidation catalyst from, temperature of the catalyst, ratio of HC to NOx and $NO_2$ in the engine exhaust gases; inferring $N_2O$ out of the selective reduction catalyst from temperature of the selective reduction catalyst, the inferred $N_2O$ formation from the oxidation catalyst, NOx from the diesel engine, and the ammonia; heating the oxidation catalyst with an electric heater to reduce the $N_2O$ formation from the oxidation catalyst when the oxidation catalyst temperature is below a predetermined range and the inferred $N_2O$ out of the selective reduction catalyst exceeds a preselected amount; and discontinuing the electric heating when the oxidation catalyst temperature exceeds the predetermined range.

In a more specific aspect, power output of the diesel engine is reduced when the inferred $N_2O$ out of the selective reduction catalyst is above a predetermined value. Further, the electric motor is controlled to provide power related to the reduction in power from the diesel engine.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
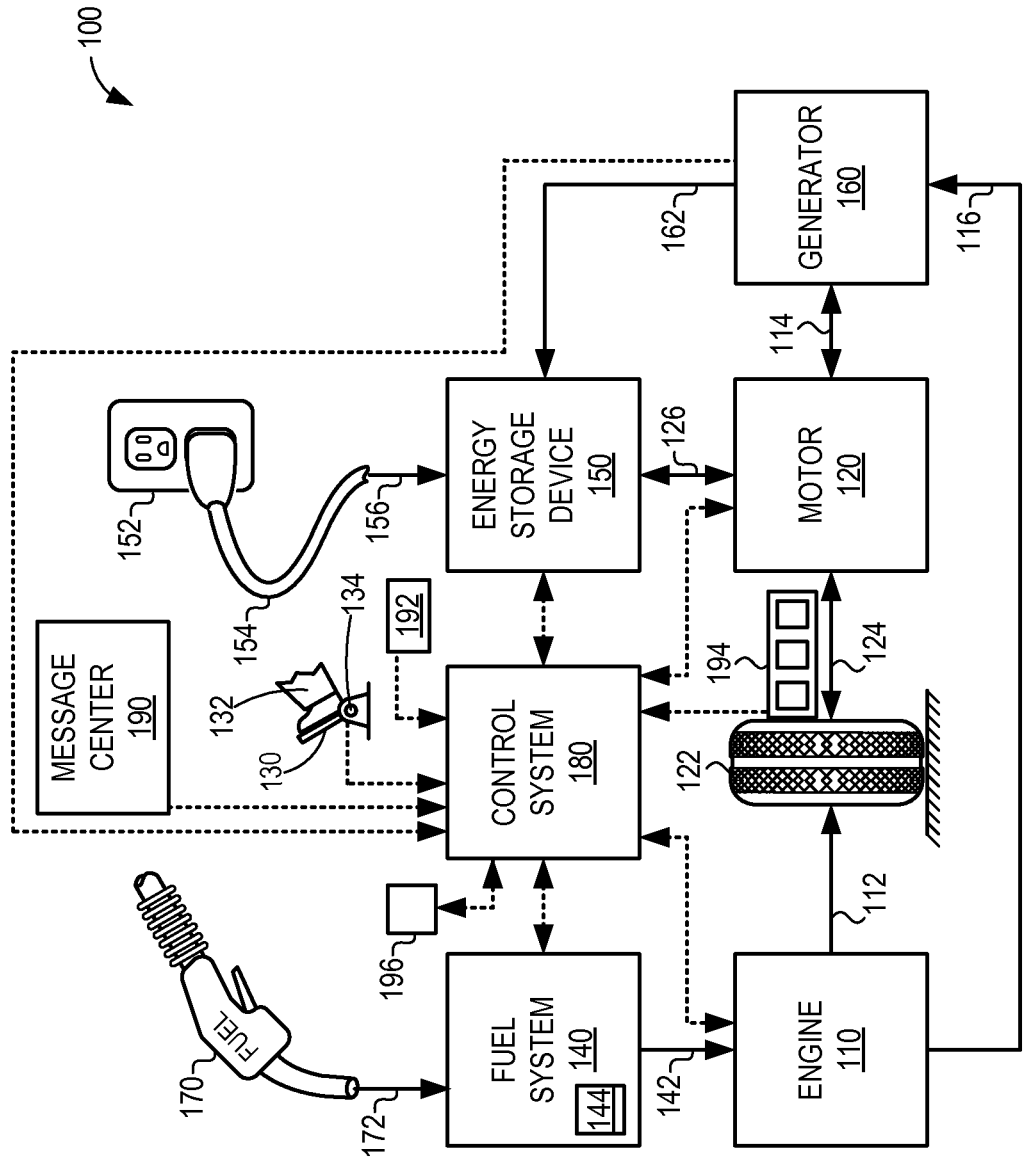
FIG. 1 illustrates an example hybrid vehicle propulsion system.
Figure 2:
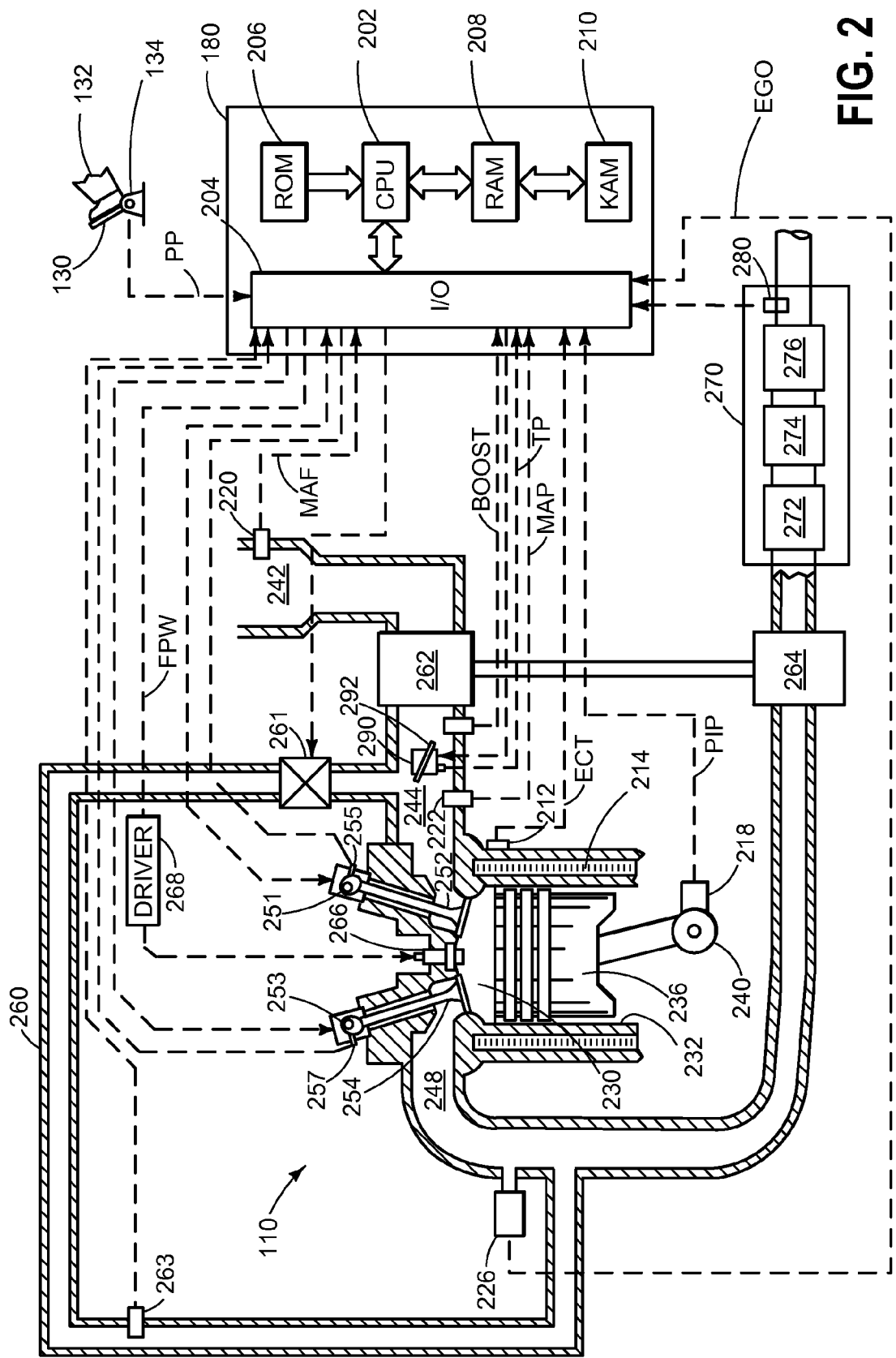
FIG. 2 shows a schematic diagram of an engine system.
Figure 3:
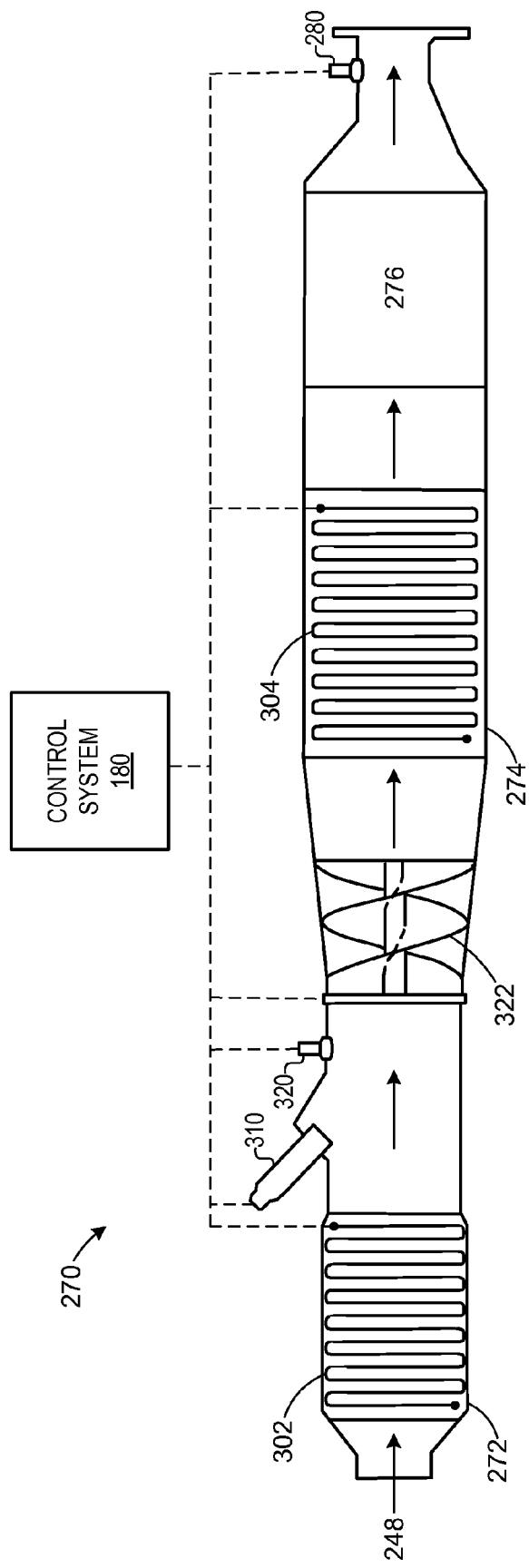
FIG. 3 shows an example emissions control system according to the present disclosure.
Figure 4:
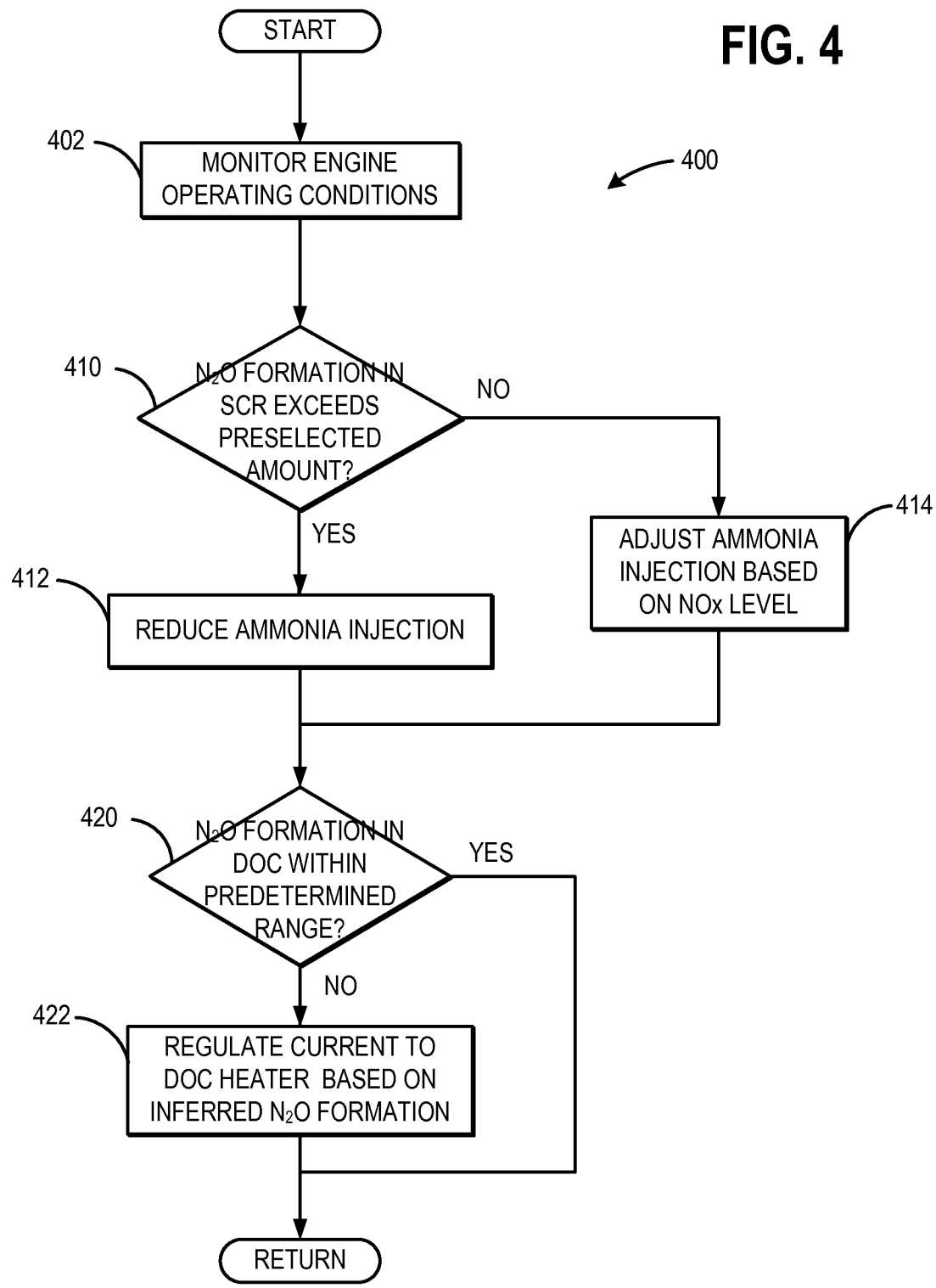
FIG. 4 shows an example flow chart for independently monitoring $N_2O$ out of an oxidation catalyst and reducing the generation of $N_2O$ therefrom.
Figure 5:
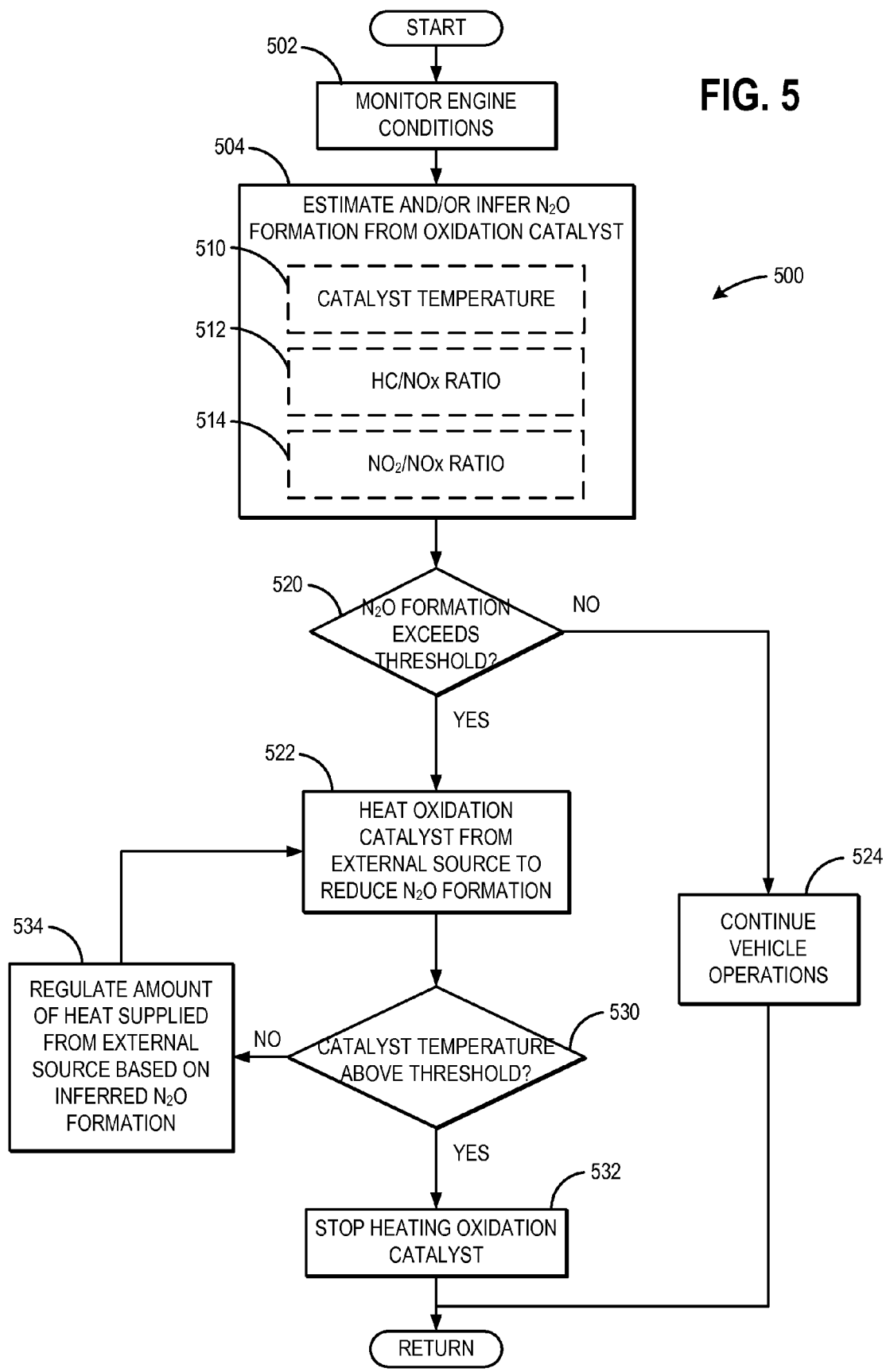
FIG. 5 is an example flow chart for heating an oxidation catalyst to reduce $N_2O$ formation therein.
Figure 6:
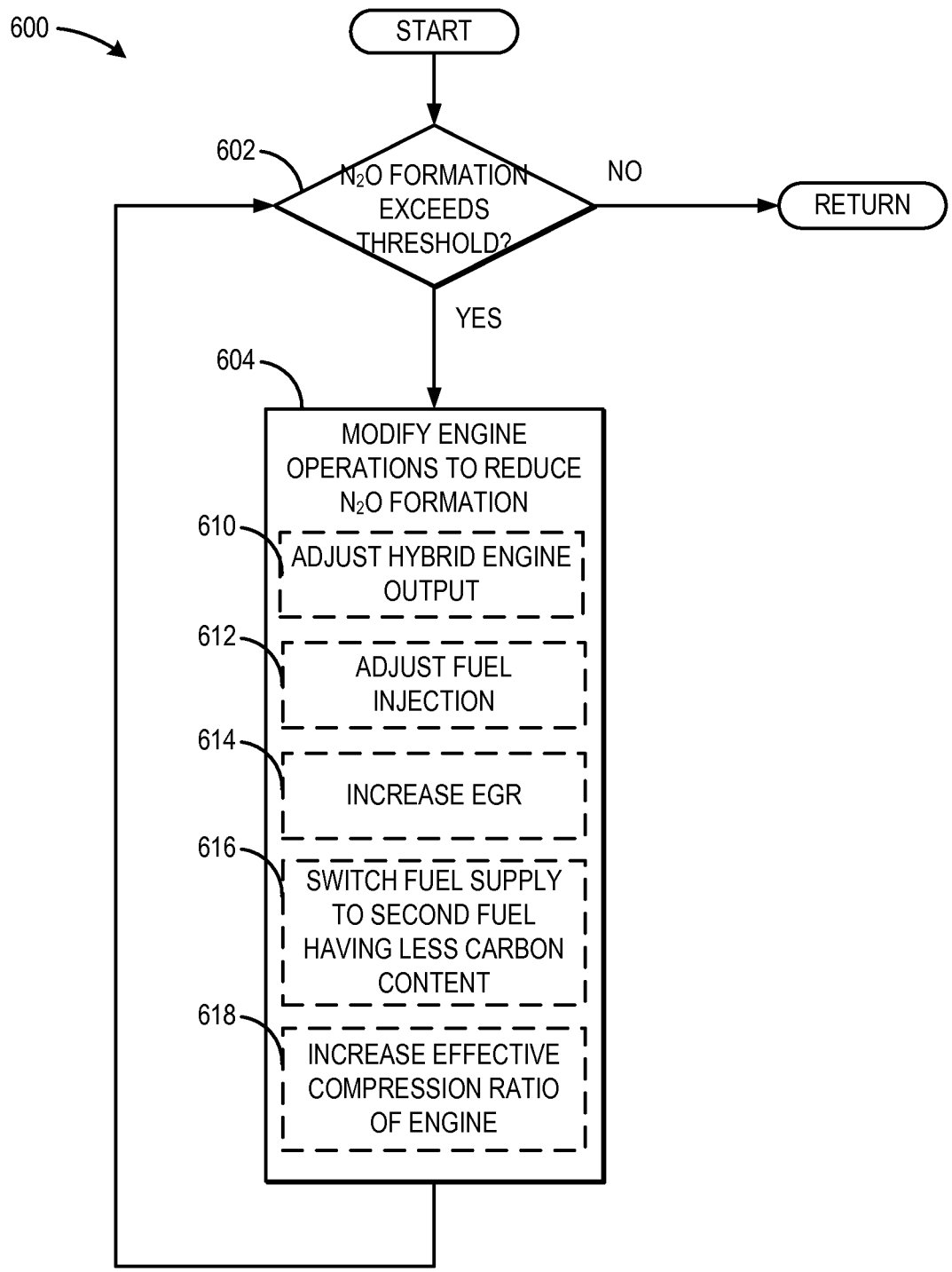
FIG. 6 shows an example flow chart for adjusting one or more engine operations to reduce $N_2O$ formation in the exhaust system.
Figure 7:
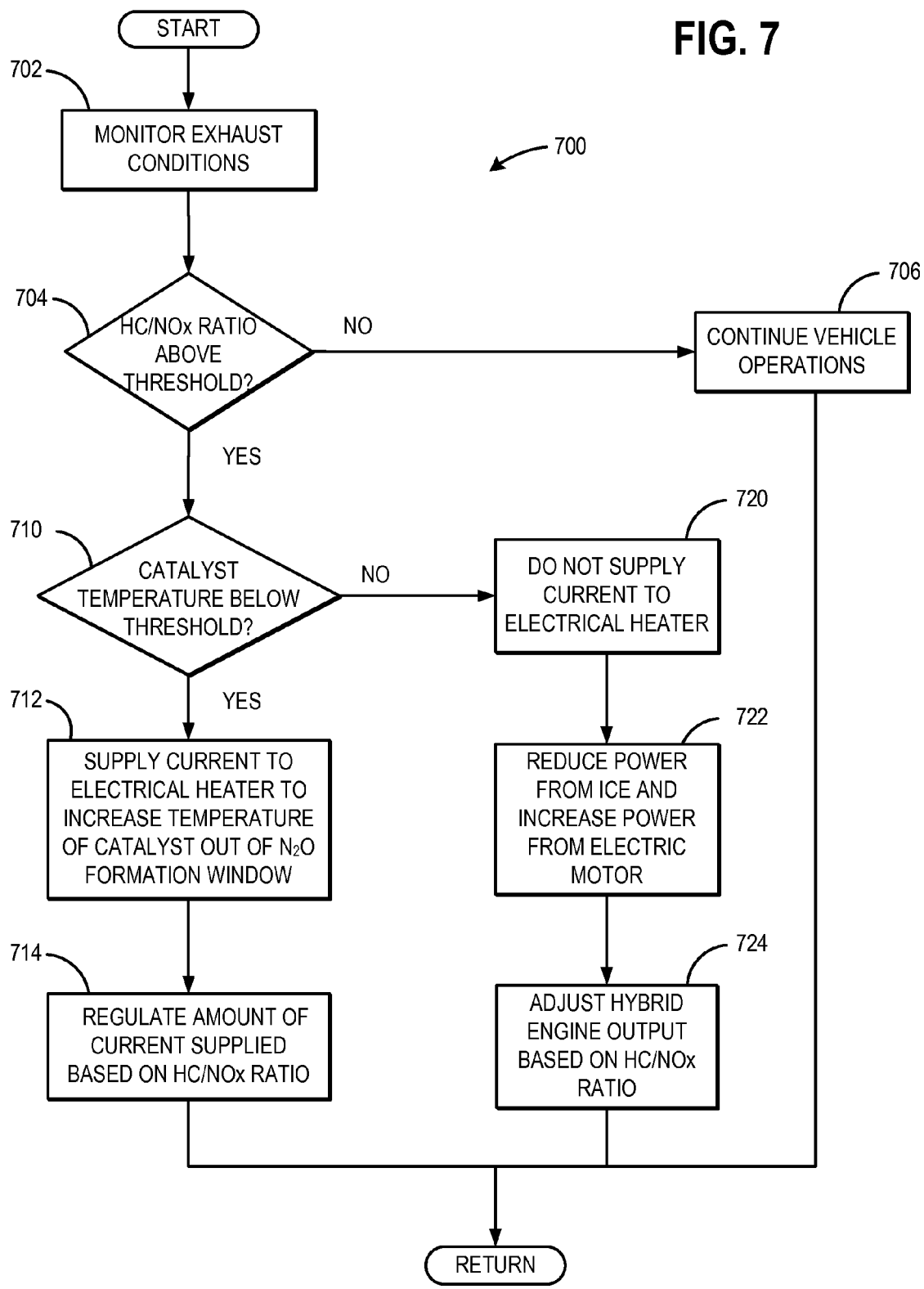
FIG. 7 shows an example flow chart illustrating an example modification of engine operations in response to an engine condition.
Figure 8:
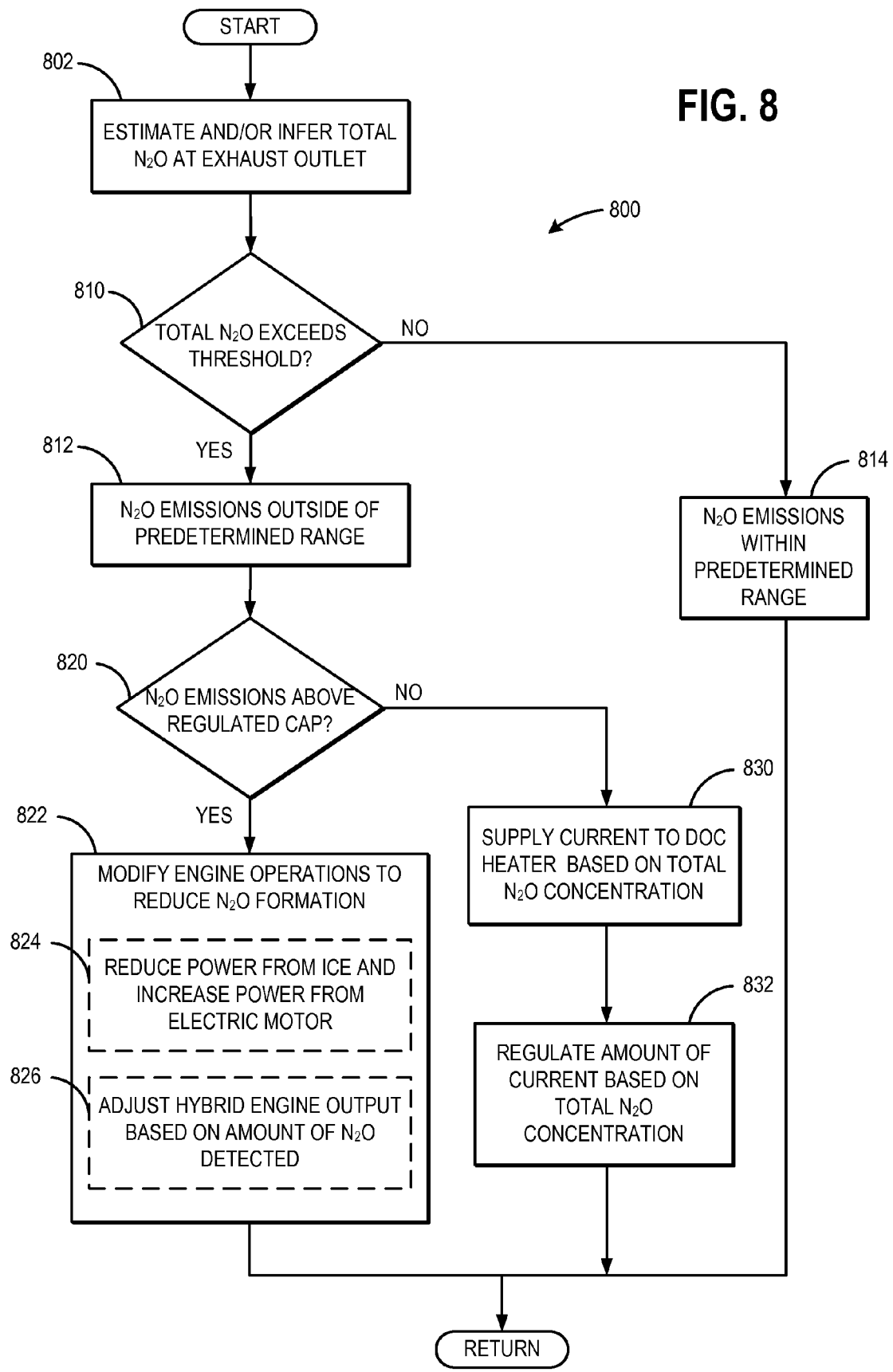
FIG. 8 shows an example flow chart for reducing $N_2O$ emissions based on $N_2O$ generation relative to a regulated cap.
Figure 9:
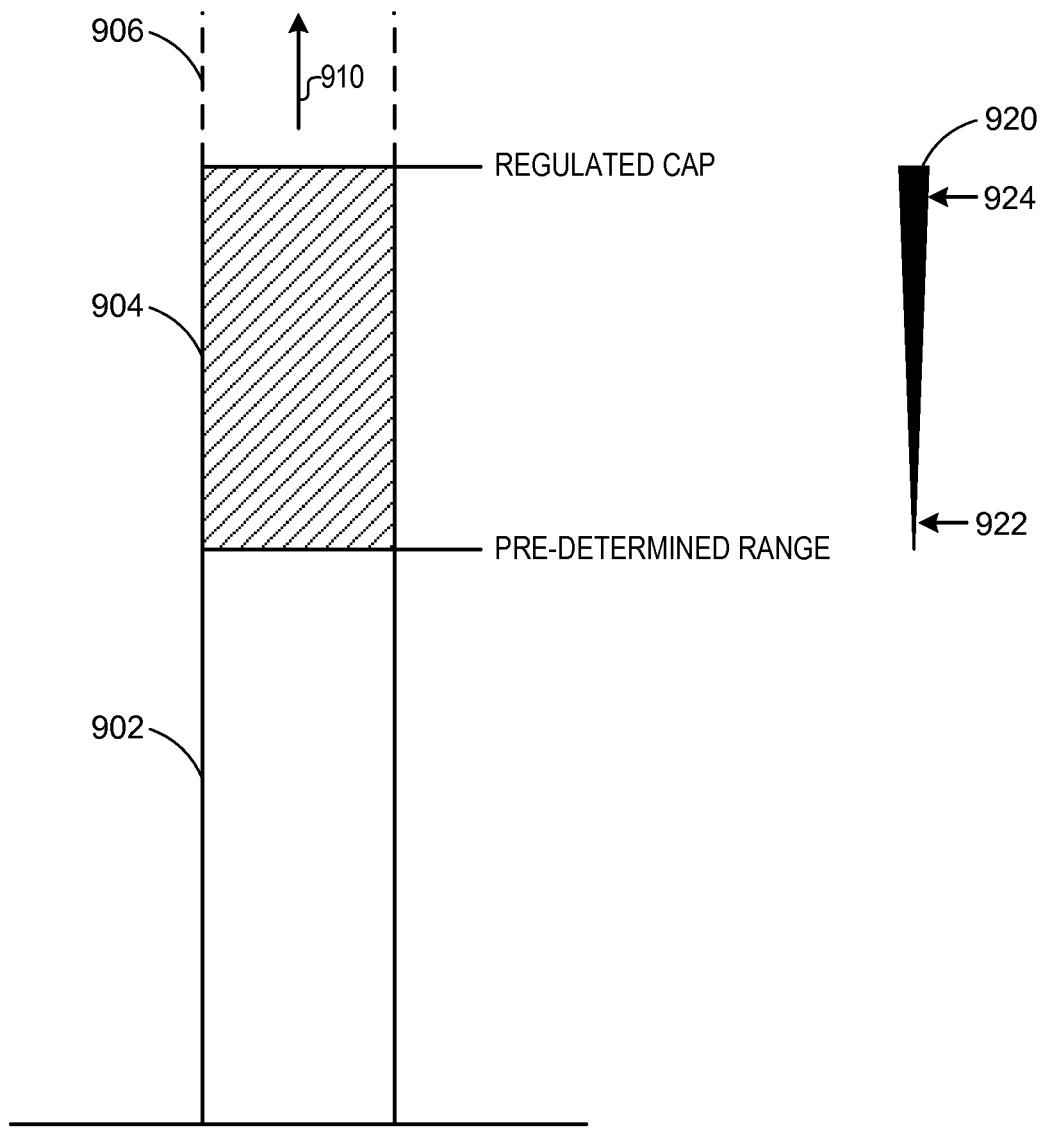
FIG. 9 further shows an example graph illustrating a predetermined range wherein one or more engine modifications are made to reduce an $N_2O$ formation relative to the regulated cap.
Figure 10:
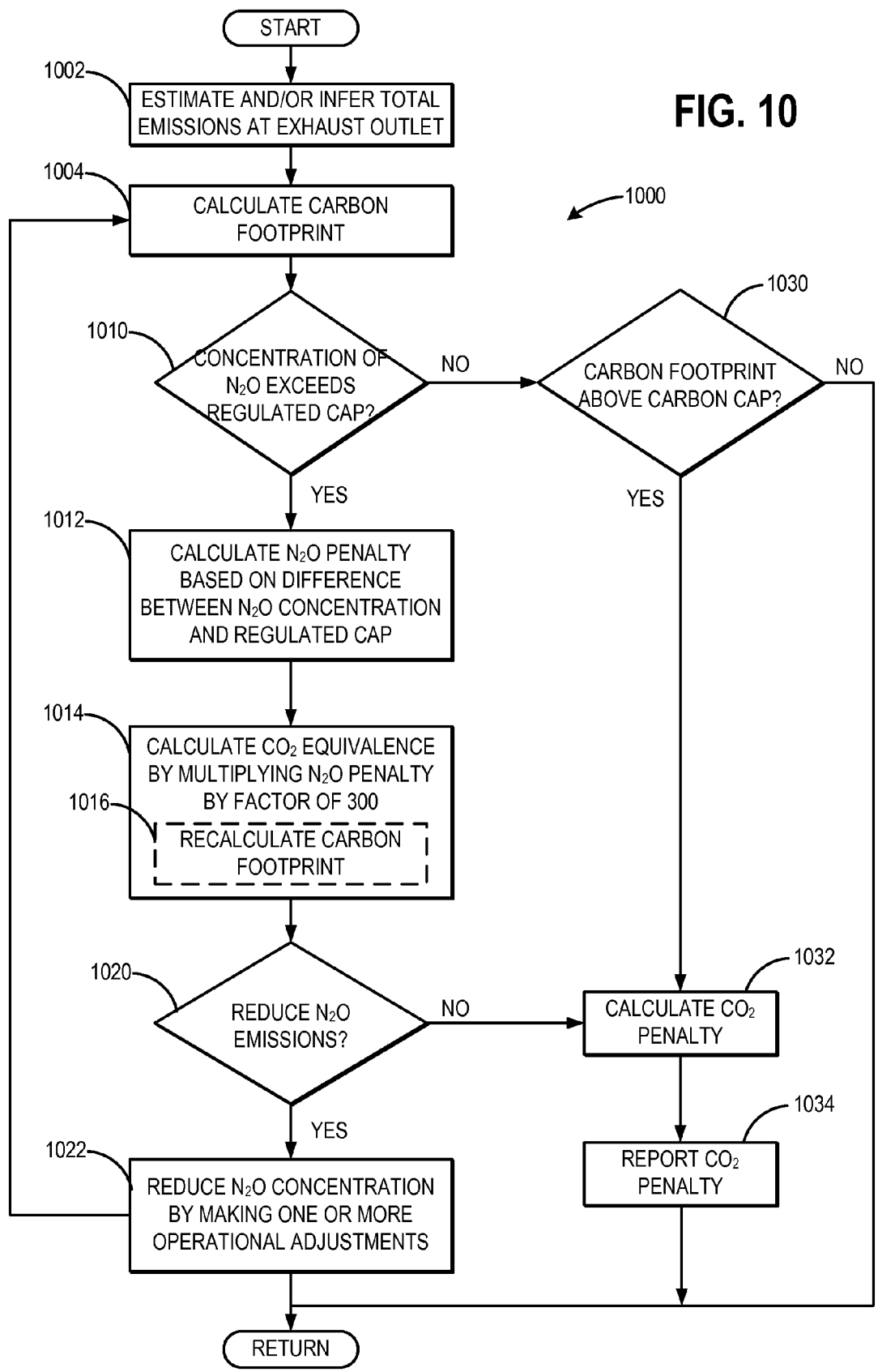
FIG. 10 shows an example flow chart for managing a carbon penalty during vehicle operation based on the inferred $N_2O$ emissions therefrom.

The inventors have recognized that $N_2O$ is most likely to be created in the low temperature exhaust gas aftertreatment systems of diesel engines and hybrid-diesel engines in particular. As such, for simplicity, methods for controlling $N_2O$ generation in an example hybrid-diesel engine are described herein. In particular, FIGS. 1 and 2 illustrate an example hybrid vehicle propulsion system and schematic engine diagram, respectively. Then, FIG. 3 shows an example emissions control system according to the present disclosure. With respect to control of the emissions system, FIG. 4 shows an example flow chart for independently monitoring $N_2O$ out of an oxidation catalyst and reducing the generation of $N_2O$ therefrom, while the example flow charts of FIGS. 5-7 illustrate various methods for adjusting one or more engine operations to reduce $N_2O$ emissions within the exhaust system. Because $N_2O$ is a regulated greenhouse gas, FIGS. 8-10 are included to illustrate example methods for reducing $N_2O$ emissions based on the regulated cap to prevent a carbon penalty.

Turning to the hybrid-diesel engine, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume diesel fuel (e.g., iso-octane) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 122 as indicated by arrow 124 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 122 as indicated by arrow 124 where the motor may convert the kinetic energy of the vehicle to electrical energy for storage at energy storage device 150 as indicated by arrow 126. This operation may be referred to as regenerative braking of the vehicle. Thus, motor 120 can provide a generator function in some embodiments. However, in other embodiments, generator 160 may instead receive wheel torque from drive wheel 122, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 122 as indicated by arrow 112 while motor 120 is deactivated. During other operating conditions, both engine 110 and motor 120 may each be operated to propel the vehicle via drive wheel 122 as indicated by arrows 112 and 124, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 122 as indicated by arrow 124. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

As will be described with reference to the process flow of FIGS. 6 and 7, the vehicle propulsion system may be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 180 may communicate with one or more of engine 110, motor 120, fuel system 140, energy storage device 150, and generator 160. As described herein, control system 180 may receive sensory feedback information from one or more of engine 110, motor 120, fuel system 140, energy storage device 150, and generator 160. Further, control system 180 may send control signals to one or more of engine 110, motor 120, fuel system 140, energy storage device 150, and generator 160 responsive to this sensory feedback. Control system 180 may receive an indication of an operator requested output of the vehicle propulsion system from a vehicle operator 132. For example, control system 180 may receive sensory feedback from pedal position sensor 134 which communicates with input device 130. In this example, input device 130 includes an accelerator pedal and a pedal position sensor 134 for generating a proportional pedal position signal PP. Pedal 130 may refer schematically to an accelerator pedal and/or a brake pedal.

Energy storage device 150 may periodically receive electrical energy from a power source 152 residing external to the vehicle (e.g., not part of the vehicle) as indicated by arrow 156. As a non-limiting example, vehicle propulsion system 100 may be configured as a plug-in hybrid electric vehicle (HEV), whereby electrical energy may be supplied to energy storage device 150 from power source 152 via an electrical energy transmission cable 154. During a recharging operation of energy storage device 150 from power source 152, electrical transmission cable 154 may electrically couple energy storage device 150 and power source 152. While the vehicle propulsion system is operated to propel the vehicle, electrical transmission cable 154 may be disconnected between power source 152 and energy storage device 150. Control system 180 may identify and/or control the amount of electrical energy stored at the energy storage device, which may be referred to as the state-of-charge.

In other embodiments, electrical transmission cable 154 may be omitted, where electrical energy may be received wirelessly at energy storage device 150 from power source 152. For example, energy storage device 150 may receive electrical energy from power source 152 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

This plug-in hybrid electric vehicle, as described with reference to vehicle propulsion system 100, may be configured to utilize a secondary form of energy (e.g., electrical energy) that is periodically received from an energy source that is not otherwise part of the vehicle.

The vehicle propulsion system 100 may also include a message center 190, ambient temperature/humidity sensor 192, and a roll stability control sensor, such as a lateral and/or longitudinal and/or yaw rate sensor(s) 194. The message center may include indicator light(s) and/or a text-based display in which messages are displayed to an operator, such as a message requesting an operator input to start the engine. The message center may also include various input portions for receiving an operator input, such as buttons, touch screens, voice input/recognition, etc. In an alternative embodiment, the message center may communicate audio messages to the operator without display.

FIG. 2 is a schematic diagram showing one cylinder of multi-cylinder engine 110, which may be included in a propulsion system of an automobile. Engine 110 may be controlled at least partially by a control system 180 (also referred to as a controller) and by input from a vehicle operator 132 via an input device 130. Combustion chamber (e.g., a cylinder) 230 of engine 110 may include combustion chamber walls 232 with piston 236 positioned therein. In some embodiments, the face of piston 236 inside cylinder 230 may have a bowl. Piston 236 may be coupled to crankshaft 240 so that reciprocating motion of the piston is translated into rotational motion of the crankshaft. Crankshaft 240 may be coupled to at least one drive wheel of a vehicle via an intermediate transmission system. Further, a starter motor may be coupled to crankshaft 240 via a flywheel to enable a starting operation of engine 110.

Combustion chamber 230 may receive intake air from intake manifold 244 via intake passage 242 and may exhaust combustion gases via exhaust passage 248. Intake manifold 244 and exhaust passage 248 can selectively communicate with combustion chamber 230 via respective intake valve 252 and exhaust valve 254. In some embodiments, combustion chamber 230 may include two or more intake valves and/or two or more exhaust valves.

Intake valve 252 may be controlled by controller 180 via electric valve actuator (EVA) 251. Similarly, exhaust valve 254 may be controlled by controller 180 via EVA 253. During some conditions, controller 180 may vary the signals provided to actuators 251 and 253 to control the opening and closing of the respective intake and exhaust valves. The position of intake valve 252 and exhaust valve 254 may be determined by valve position sensors 255 and 257, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 230 may alternatively include an intake valve controlled via electric valve actuation and an exhaust valve controlled via cam actuation including CPS and/or VCT.

Fuel injector 266 is shown coupled directly to combustion chamber 230 for injecting fuel directly therein. Fuel injection may be via a common rail system, or other such diesel fuel injection system. Fuel may be delivered to fuel injector 266 by a high pressure fuel system (not shown) including a fuel tank, a fuel pump, and a fuel rail. In some embodiments, cylinder 230 may optionally include a spark plug, which may be actuated by an ignition system. A fuel injector 266 may be provided in the cylinder to deliver fuel directly thereto. However, in other embodiments, the fuel injector may be arranged within intake manifold 244 upstream of intake valve 252. Fuel injector 266 may be actuated by a driver 268.

Intake passage 242 may include a throttle 290 having a throttle plate 292. In this particular example, the position of throttle plate 292 may be varied by controller 180 via a signal provided to an electric motor or actuator included with throttle 290, a configuration that is commonly referred to as electronic throttle control (ETC). In this manner, throttle 290 may be operated to vary the intake air provided to combustion chamber 230 among other engine cylinders. The position of throttle plate 292 may be provided to controller 180 by throttle position signal TP. Intake passage 242 may include a mass air flow sensor 220 and a manifold air pressure sensor 222 for providing respective signals MAF and MAP to controller 180.

Further, in the disclosed embodiments, an exhaust gas recirculation (EGR) system may route a desired portion of exhaust gas from exhaust passage 248 to intake passage 244 via EGR passage 260. The amount of EGR provided to intake passage 244 may be varied by controller 180 via EGR valve 261. Further, an EGR sensor 263 may be arranged within the EGR passage and may provide an indication of one or more pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. While FIG. 2 shows a high pressure EGR system, alternatively, a low pressure EGR system may be used where EGR is routed from downstream of a turbine of a turbocharger to upstream of a compressor of the turbocharger.

As such, Engine 110 may further include a compression device such as a turbocharger or supercharger including at least a compressor 262 arranged along the intake manifold. For a turbocharger, compressor 262 may be at least partially driven by a turbine 264 (e.g., via a shaft) arranged along exhaust passage 248. For a supercharger, compressor 262 may be at least partially driven by the engine and/or an electric machine, and may not include a turbine. Thus, the amount of compression provided to one or more cylinders of the engine via a turbocharger or supercharger may be varied by controller 180.

Exhaust gas sensor 226 is shown coupled to exhaust passage 248 upstream of emissions control system 270. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, and/or CO sensor.

Emissions control system 270 is shown arranged along exhaust passage 248 downstream of exhaust gas sensor 226. System 270 may include a diesel oxidation catalyst (DOC) 272, selective catalytic reduction (SCR) system, three way catalyst (TWC), NOx trap, various other emission control devices, or combinations thereof. For example, as described in greater detail below, emissions system 270 may be a DOC system which includes SCR catalyst 274 and a diesel particulate filter (DPF) 276. In some embodiments, DPF 276 may be located downstream of the catalysts (as shown in FIGS. 2 and 3), while in other embodiments, DPF 276 may be positioned upstream of one or more of the DOC and SCR catalyst (not shown). Emissions control system 270 may further include an exhaust gas sensor 280. Sensor 280 may be any suitable sensor for providing an indication of a concentration of exhaust gas constituents such as a $NO_x$, $NH_3$, or EGO sensor, for example. In addition, sensor 280 may be a temperature or pressure sensor in some instances. Further, in some embodiments, during operation of engine 110, emissions control device 270 may be periodically reset by operating at least one cylinder of the engine within a particular air/fuel ratio.

Controller 180 is shown in FIG. 2 as a microcomputer, including microprocessor unit 202, input/output ports 204, an electronic storage medium for executable programs and calibration values shown as read-only memory chip 206 in this particular example, random access memory 208, keep alive memory 210, and a data bus. Controller 180 may receive various signals from sensors coupled to engine 110, in addition to those signals previously discussed, including measurement of inducted mass air flow (MAF) from mass air flow sensor 220; engine coolant temperature (ECT) from temperature sensor 212 coupled to cooling sleeve 214; a profile ignition pickup signal (PIP) from Hall effect sensor 218 (or other type) coupled to crankshaft 240; throttle position (TP) from a throttle position sensor; and absolute manifold pressure signal, MAP, from sensor 222. Engine speed signal, RPM, may be generated by controller 180 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 218, which is also used as an engine speed sensor, may produce a predetermined number of equally spaced pulses every revolution of the crankshaft.

Storage medium read-only memory 206 can be programmed with computer readable data representing instructions executable by processor 202 for performing the methods described below as well as other variants that are anticipated but not specifically listed.

As described above, FIG. 2 shows only one cylinder of a multi-cylinder engine, and each cylinder may similarly include its own set of intake/exhaust valves, fuel injector, spark plug, etc.

Turning now to the exhaust system according to the present disclosure, FIG. 3 shows emissions control system 270 in greater detail. As described above, emissions control system 270 is arranged along exhaust passage 248 downstream of exhaust gas sensor 226. Further, emissions control system 270 includes DOC 272, SCR 274, and DPF 276 in addition to exhaust gas sensor 280. For simplicity, one arrangement of exhaust components is shown herein; however, other arrangements are possible. For example, in another embodiment, DPF 276 may be located upstream of SCR 274 rather than downstream as shown. In still another embodiment, SCR 274 may be located upstream of DOC 272, which may be located downstream of the SCR catalyst but upstream of DPF 276, etc.

The arrows shown along exhaust passage 248 indicate the direction of airflow through emissions control system 270. Briefly, airflow initially enters DOC 272, which includes DOC heater 302 for electrically heating the DOC catalyst. As described in greater detail below, control system 180 may regulate a current supplied to DOC heater 302 in order to control the amount of heat supplied to DOC 272 and therefore the temperature of the DOC catalyst. For example, this may be done in order to increase the temperature of the oxidation catalyst above a temperature range associated with $N_2O$ generation. One potential source of $N_2O$ in the exhaust system results from the reaction of hydrocarbons (HC) and NOx within DOC 272 during HC light-off. Therefore, in response to detection of a high HC and/or NOx level upstream of DOC 272, control system 180 may increase a current supplied to DOC heater 302 under certain operating conditions to increase the temperature of the catalyst out of the temperature range associated with $N_2O$ formation, which may also be referred to as an $N_2O$ formation window. These intrusive actions may be taken in order to reduce the amount of $N_2O$ produced in the exhaust system since $N_2O$ is extremely stable in the atmosphere once formed. For example, $N_2O$, which is a greenhouse gas, has an estimated lifetime in the atmosphere of 114 years. The global warming potential of $N_2O$ has also been estimated as approximately 298 times that of $CO_2$ on a mass basis. Therefore, reducing the amount of $N_2O$ released into the atmosphere is of particular concern.

With respect to the $N_2O$ formation window, an optimum temperature for $N_2O$ conversion within the oxidation catalyst depends on the amount of platinum and palladium present in the catalyst. For example, an oxidation catalyst may include a washcoat of palladium or platinum or both. The specific composition then allows for an adjustable $N_2O$ formation window based on the catalyst composition. As one example, when the amount of platinum in the oxidation catalyst is decreased relative to the amount of palladium present, the $N_2O$ formation window shifts to a higher temperature range. As such, when more palladium is present in the catalyst, the catalyst may be heated to higher temperatures in order to move the oxidation catalyst out of the temperature region associated with $N_2O$ generation. Conversely, if less palladium is present relative to the amount of platinum in the oxidation catalyst, the $N_2O$ formation window may reside at a lower temperature range. In this way, the methods described herein may include adjusting an $N_2O$ formation window based on the catalyst composition. In addition, an oxidation catalyst may alternatively be washcoated onto a cordierite substrate along with a metallic or zeolite substrate. The metallic substrate allows for the catalyst to be heated electrically since metals are good heat conductors. The zeolite substrates may be added to aid in cold start control of HC by absorbing HC at low temperatures and then releasing HC after reaching the activity window for oxidation.

As one example, the inventors have studied the effect of precious metal type and loading in the DOC. In one set of experiments, the temperature of peak $N_2O$ production fell into a tight band in the range of about 200-225° C., which corresponded to the temperature window of HC combustion. Then, a high-loaded Pt sample had the highest $N_2O$ production at a peak of 20% of the total feedgas NOx. Combinations of Pt and Pd had a range of $N_2O$ from 7% to 15%, while the Pd only sample had the lowest level with a peak at 5% of the total feedgas NOx. The observed trend roughly followed the order of NO oxidation activity of each catalyst as Pt is known to create $NO_2$ while Pd is not as capable compared to Pt. In addition, the temperature window for $N_2O$ formation via HC+NOx was between 150 and 350° C., the typical range for the onset of catalytic HC oxidation and the range experienced during drive cycles used for chassis vehicle emissions certification. For Pt catalysts, a noticeable coincidence was observed when propene was used as the reductant. Once propene reached complete oxidation, the NOx reduction and $N_2O$ formation decreased due to lack of reductant until the only NOx reaction was NO oxidation. While propene was partially oxidized during light-off, it was available to reduce part of the Pt and facilitate the adsorption of NO, which could then dissociate to $N_2$ and $O_2$. $N_2O$ was then formed when $N_2$ interacted with another molecule of adsorbed NO, which has been noted as a potential problem on Pt catalysts.

As another example, the inventors studied $N_2O$ formation based on changes of the HC/NOx ratio in the pulsator feedgas using a low loaded, Pd rich (1 part Pt to 4 parts Pd) DOC sample. On the vehicle, HC/NOx ratios may be increased at certain times such as during active heating strategies to rapidly warm the catalyst system during cold start and filter regeneration. In the experiments, the inlet HC/NOx ratio was decreased to 2:1, which resulted in a drop in peak $N_2O$ to a value of about 6%, and increased by three times to 18:1 for a peak $N_2O$ of 9%. The ratio of 18:1 roughly represented cold start HC/NOx ratios when rapid catalyst heating or filter regeneration strategies were employed using excess fuel injection. The temperature of the peak value of $N_2O$ was observed to shift from 225° C. down to 200° C. from the lowest to the highest HC/NOx ratio.

As yet another example, the inventors studied the effect of zeolite within the DOC formulation on $N_2O$ formation. Zeolites are added to aid in cold start control of HC by adsorbing HC at low temperatures and then releasing the HC after reaching the activity window for oxidation. Three zeolite-containing samples were tested with varying levels of precious metals, e.g., Pt only (1 part Pt to 0 parts Pd), Pt rich (2 parts Pt to 1 part Pd), and Pd rich (1 part Pt to 4 parts Pd). In one set of experiments, the temperature was ramped from a low level to a high level to ensure saturation of HC within the oxidation catalyst, as might occur upon ignition of a vehicle. Results demonstrated that the Pt only sample produced the highest amount of $N_2O$, followed by the Pt rich sample, and the lowest $N_2O$ was produced from the Pd rich sample. Furthermore, a peak shift was observed from a higher temperature to a lower temperature as described above with respect to the studies of HC/NOx feedgas ratio, however, addition of zeolite produced a shift to even lower temperatures of 150° C. with a peak $N_2O$ value of 25% of the feedgas NOx.

Chemical reactions occurring within a diesel catalyst system are primarily oxidation and reduction reactions. For this reason, when one or more catalysts are present in a diesel exhaust system, the functions of each catalyst are staged to enhance the overall system performance. Thereby, the diesel exhaust system is designed to work in an environment of high oxygen content where three-way catalysts do not function. For example, DOC 272 may oxidize HC and carbon monoxide (CO) according to Reactions 1 and 2 below. DOC 272 may also provide an exotherm for filter regeneration when engine out HC levels are increased. Further, oxidation of nitrogen oxide (NO) to nitrogen dioxide ($NO_2$) can also take place in DOC 272 via reaction 3. For this reason, SCR catalyst 274 is included downstream of DOC 272 for the selective reduction of NO and $NO_2$ with ammonia according to Reactions 5-7. DPF 276 is included to oxidize carbonaceous soot as well as slipped HC from the catalysts located upstream via Reaction 11. Overall, the emissions control system may prevent HC, CO, NOx and soot from entering the atmosphere with consistent lean engine operations. Although the system herein includes three catalysts, in some embodiments, various combinations of catalysts may be present in combination with the electrically heated diesel oxidation catalyst. The system described herein includes all three catalysts for simplicity.

Potential sources of $N_2O$ within the exhaust system are: reaction of HC and NOx within DOC 272 during HC light-off (Reaction 4), side reactions of ammonia, NOx and oxygen on SCR 274 (Reactions 8-10), and oxidation of slipped ammonia on DPF 276 (Reaction 12). Therefore, the system and methods described may further reduce the amount of $N_2O$ formed within the exhaust system by adjusting one or more engine operations based on an inferred $N_2O$ formation therein. For instance, in response to a high $N_2O$ formation within DOC 272, the catalyst may be electrically heated to move the catalyst out of an $N_2O$ formation window. Alternatively or additionally, one or more engine operations may be performed (e.g., by increasing a compression ratio of the engine) to reduce the amount of $N_2O$ formed in the exhaust system. Reactions within the DOC:

$$HC + O_2 \rightarrow CO_2, H_2O \qquad [1]$$

$$2CO + O_2 \rightarrow 2CO_2 \qquad [2]$$

$$2NO + O_2 \rightarrow 2NO_2 \qquad [3]$$

$$HC + NOx \rightarrow N_2O, H_2O, CO_2 \qquad [4]$$

Reactions within the SCR system:

$$4NH_3 + 4NO + O_2 \rightarrow 4N_2, 6H_2O \quad [5]$$

$$8NH_3 + 6NO_2 \rightarrow 7N_2, 12H_2O \quad [6]$$

$$2NH_3 + NO + NO_2 \rightarrow 2N_2, 3H_2O \quad [7]$$

$$NH_4NO_3 \rightarrow N_2O, 2H_2O \quad [8]$$

$$2NH_3 + 2NO_2 \rightarrow N_2O, N_2, 3H_2O \quad [9]$$

$$2NH_3 + 2O_2 \rightarrow N_2O, 3H_2O \quad [10]$$

Reactions within the catalyzed filter:

$$C(soot), HC + O_2 \rightarrow CO_2, H_2O \quad [11]$$

$$2NH_3 + 2O_2 \rightarrow N_2O, 3H_2O \quad [12]$$

Returning to emissions control system 270 shown in FIG. 3, once the exhaust gas airflow exits DOC 272, the airflow continues in the direction of SCR 274. As shown, a reductant injection system is further provided for injecting liquid reductant to SCR catalyst 274. For example, the reductant injected may be either urea or ammonia. The reductant injection system includes reductant injector 310, which is configured to inject a liquid reductant, such as a urea solution, into an exhaust gas flow path within exhaust passage 248. In the present embodiment, injector 310 is angled relative to the exhaust passage 248. However, in alternate embodiments the injector may be either parallel to or perpendicular to the exhaust passage. Further, the injector may include either air-assisted or hydraulic injection hardware (not shown). Urea injected into exhaust passage 248 may be converted to ammonia under certain conditions (e.g., in the presence of sufficient heat), which may be used to reduce NOx and/or stored in the SCR catalyst.

Exhaust temperatures may be measured via one or more temperature sensors located in exhaust passage 248, such as exhaust gas temperature sensor 320. Alternatively, exhaust temperature may be inferred based on engine operating conditions such as speed, load, air-fuel ratio (AFR), spark retard, etc. Although exhaust gas temperature sensor 320 is shown coupled to exhaust passage 248, in some embodiments, the temperature sensor may be coupled directly to one or more of DOC 272 and SCR 274 for directly measuring a catalyst temperature. Exhaust passage 248 is further shown including mixing device 322 for enhancing the flow mixing downstream of reductant injector 310. However, this in non-limiting and emissions control system 270 may also be configured without mixing device 322 in some embodiments. When present, mixing device 322 may be configured as a circular disc of fin sections in one non-limiting example. Further, the spray pattern provided by injector 310 may include any suitable pattern for improving the evaporation rate and mixing of reductant with exhaust gases. For example, an injector may provide sprays that form sheets, filled cones, hollow cones, multiple cones, etc. Mixing device 322, reductant injector 310, and exhaust gas temperature sensor 320 may communicate with control system 180, which may further control a rate at which mixing device 322 rotates and/or a reductant delivery via injector 310 (e.g., by adjusting a timing and/or amount of reductant injected).

SCR catalyst 274 located downstream of DOC 272 is include to selectively reduce NO and $NO_2$ with ammonia according to Reactions 5-7. For example, NOx not removed by DOC 272 may react with ammonia in SCR 274. Further, inert chemical products $N_2$ and $H_2O$ may result that are released to the atmosphere. However, as shown herein, chemical reactions occurring in SCR 274 may also produce $N_2O$ according to Reactions 9 and 10. Therefore, SCR 274 may also include an $N_2O$ formation window in the same manner as described above for DOC 272. For this reason, SCR 274 may include SCR heater 304 for electrically heating the reduction catalyst during the engine drive cycle. DPF 276 is located downstream of SCR 274 for oxidizing carbonaceous soot as well as slipped HC from the upstream catalysts. Exhaust sensor 280 located at the exhaust outlet (or at any point downstream of DPF 276) may be any suitable sensor for providing an indication of a concentration of exhaust gas constituents such as a $NO_x$, $NH_3$, or EGO sensor, for example. In addition, sensor 280 may be a temperature and/or pressure sensor in some instances. In some embodiments, during operation of engine 110, emission control system 270 may be periodically reset by operating at least one cylinder of the engine within a particular air/fuel ratio.

If $NO_2$ is coming into the SCR system under normal vehicle operating conditions, $N_2O$ emissions can be generated via Reactions 8 and 9. The inventors further studied these reactions using a Cu/zeolite catalyst. In the studies, the inlet $NO_2$/NOx ratio was varied from one to zero in steps of 0.25 and the disappearance of NOx was measure. The inventors found that the optimal NOx conversion occurred at a ratio of 0.5, and the poorest conversion occurred when the NOx was substantially all $NO_2$. In general, $N_2O$ formation by the SCR reactions decreased with decreasing $NO_2$ in the feedgas line. Further, some $N_2O$ was detected even with only NO in the feed, which indicated that some NO oxidation occurred on the SCR catalyst itself.

The inventors have further found that the formation of $N_2O$ was minimized through the use of low-loaded, Pd-rich DOCs and Cu/chabazite SCR catalysts. The exhaust gas temperature window was either low (200-300° C.) during city/highway driving or high (600° C.) during filter regeneration. However, these temperature ranges are at the opposite ends of an SCR operation window, which allowed $N_2O$ emissions by the SCR catalysts to be minimized. While the low range of 200-300° C. falls within the $N_2O$ formation window by the DOCs, the use of low loaded, Pd-rich formulations and careful control of engine out HC as described herein may be used to reduce $N_2O$ formation.

Turning to control of the emissions control system during vehicle operations, FIGS. 4-10 show example flow charts illustrating how one or more operational adjustments may be made to reduce $N_2O$ emissions from the engine exhaust system.

FIG. 4 shows an example flow chart of method 400 for independently monitoring each catalyst and reducing an $N_2O$ generation therefrom. For example, the system described above may route exhaust gases from the engine through an oxidation catalyst (e.g., DOC 272) which includes a washcoat with palladium or platinum or both, then from the oxidation catalyst into a selective reduction catalyst (e.g., SCR 274) wherein ammonia may be added under predetermined conditions to reduce NOx. However, because no sensor is available to measure $N_2O$ formation specifically, the methods described include inferring $N_2O$ formation from the oxidation catalyst from one or more of the temperature of the catalyst, and/or the amount of HC and NOx and $NO_2$ in the engine exhaust gases; and inferring $N_2O$ out of the selective reduction catalyst from one or more of the temperature of the selective reduction catalyst, the inferred $N_2O$ formation from the oxidation catalyst, and the amount of ammonia injected. Then, to reduce the amount of $N_2O$ generated, as one example, method 400 includes heating the oxidation catalyst using an external source to reduce $N_2O$ out of the selective reduction catalyst when the oxidation catalyst temperature is below a predetermined range and $N_2O$ out of said selective reduction catalyst exceeds a preselected amount.

At 402, method 400 includes monitoring one or more engine operating conditions to determine whether a high $N_2O$ formation condition may be present within the exhaust system. At 410, method 400 further includes estimating and/or inferring $N_2O$ formation from the selective reduction catalyst, e.g., SCR 274, and comparing the $N_2O$ formation to a preselected amount to determine whether $N_2O$ formation within SCR 274 is generated in excess amounts. If the $N_2O$ formation within SCR 274 exceeds the preselected amount, method 400 proceeds to 412 and reduces an ammonia or urea injection to reduce the amount of $N_2O$ out of said selective reduction catalyst. For example, Reactions 9 and 10 show that ammonia may react with $NO_2$ and $O_2$ to generate $N_2O$ in SCR 274. Therefore, a reduction in ammonia injection may reduce the amount of $N_2O$ generated within the selective reduction catalyst. However, said reduction in ammonia may also cause a temporary increase in NOx levels. Therefore, although not shown in FIG. 4, the amount by which NOx may be temporarily increased may be determined by an on-board diagnostic threshold (or OBD threshold) that lights a malfunction indicator lamp within the vehicle upon detection of excess amounts of NOx. For example, $NO_2$/NOx levels exceeding about 0.25 may present problems with respect to $N_2O$ formation because SCR catalysts generate increased $N_2O$ when elevated levels of $NO_2$ are present in the exhaust feed downstream of the DOC. Alternatively, if the $N_2O$ formation within SCR 274 does not exceed the preselected amount, method 400 proceeds to 414, which includes injecting ammonia based on the NOx levels present in the exhaust system.

Thereafter, regardless of the inferred $N_2O$ out of said selective reduction catalyst relative to the preselected amount, at 420 method 400 also estimates and/or infers an $N_2O$ level within the oxidation catalyst, e.g., DOC 272, to determine whether an $N_2O$ formation within the DOC is within a predetermined range. If the inferred level of $N_2O$ in DOC 272 does not fall within the predetermined range, method 400 proceeds to make one or more operational adjustments to reduce the amount of $N_2O$ generated. For simplicity, at 422, method 400 includes regulating the current to DOC heater 302 based on the inferred $N_2O$ formation outside of the predetermined range. As one example, if an electrically heated catalyst is used on a hybrid vehicle with a 300V electrical system, the catalyst temperature could alternatively be increased when the vehicle is operated at low power (e.g., power output falls below a power threshold) to move out of the $N_2O$ formation window. Alternatively, if $N_2O$ formation is within the predetermined range, the vehicle may continue to operate based on a desired engine output or load as long as the inferred $N_2O$ levels remain low.

Turning to managing the electrically heated diesel oxidation catalyst, FIG. 5 shows an example flow chart of method 500 for heating the oxidation catalyst to reduce $N_2O$ formation therein. As described already, DOC 272 may include DOC heater 302 for heating the catalyst using an external source to reduce $N_2O$ formation. Therefore, control system 180 may be programmed to regulate the heating of the oxidation catalyst when $N_2O$ formation exceeds a predetermined value (e.g., exceeds a threshold). Method 500 further includes ending the heating when the catalyst temperature rises above a temperature range associated with $N_2O$ generation.

At 502, method 500 includes monitoring engine conditions. Then, in response to one or more engine conditions associated with $N_2O$ formation, control system 180 may heat DOC 272 using an external source to reduce the amount of $N_2O$ formed therein. For example, when a vehicle load is high such that increased levels of HC are formed in response to the increased fuel injection, control system 180 may regulate the current supplied to DOC heater 302 to increase the catalyst temperature out of a range associated with $N_2O$ formation.

At 504, method 500 further includes estimating and/or inferring the amount of $N_2O$ formed within the catalyst. Although emissions control system 270 may include one or more exhaust gas sensors (e.g., sensor 280) for providing an indication of a concentration of exhaust gas constituents such as a $NO_x$ within the exhaust system, these sensors may be cross-sensitive to similar chemical species like NO and $NO_2$. As such, these sensors may not provide an accurate indication of the $N_2O$ present in the exhaust system. For this reason, the amount of $N_2O$ formed from said catalyst may be estimated and/or inferred using one or more of catalyst temperature 510, a ratio of HC to NOx (e.g., HC/NOx ratio 512), and a ratio of $NO_2$ to NOx (e.g., $NO_2$/NOx ratio 514). In this way, controller 180 may be programmed to determine a level of $N_2O$ formation within a catalyst based on one or more sensors in the exhaust system. Then, at 520, control system 180 may be programmed to compare the inferred $N_2O$ formation in DOC 272 to a threshold in order to make operational adjustments for reducing the amount of $N_2O$ generated therein. Although various operational adjustments are possible and are described in greater detail below, for simplicity, FIG. 5 includes heating DOC 272 in order to increase the catalyst temperature out of a range associated with $N_2O$ formation.

When the inferred $N_2O$ formation in the oxidation catalyst exceeds a threshold, for example because the inferred amount of $N_2O$ is outside of the predetermined range, method 500 proceeds to 522 and heats the oxidation catalyst using an external source to reduce $N_2O$ formation therein. In the examples provided, the external heat source comprises an electrical heater (e.g., DOC heater 302), however this is non-limiting and in an alternate embodiment, the external heat source may comprise a heat pump in addition to or in place of the electrical heater. The external heat source is used to increase the temperature of the catalyst above a temperature range associated with $N_2O$ generation. Therefore, when the $N_2O$ formation falls below the $N_2O$ threshold, $N_2O$ formation falls within the predetermined range and method 500 proceeds to box 524 by continuing vehicle operations based on engine load without making additional adjustments. In some embodiments, the $N_2O$ threshold may correspond to a range regulated by the United States Environmental Protection Agency (U.S. E.P.A.).

Because heat supplied to the oxidation catalyst is under the control of control system 180, at 530, method 500 further includes monitoring the temperature of the catalyst in relation to a temperature threshold associated with the $N_2O$ formation window. Then, once the catalyst temperature exceeds the temperature threshold, control system 180 may end the heating from the external source as indicated at 532. Alternatively, while the temperature is below the threshold, at 534, control system 180 may regulate the amount of heat supplied from the external source of heat based on the inferred $N_2O$ formation. For example, in the temperature range below the threshold, if the amount of $N_2O$ formation increases, the current supplied to electrical heater 302 may be increased to heat the catalyst more quickly. Conversely, if the amount of $N_2O$ formation decreases, for instance, because a load on engine 110 decreases, the current supplied to electrical heater 302 may be decreased based on the decreased $N_2O$ formation inferred. As described herein, once a high $N_2O$ formation has been inferred for the catalyst, heat may be supplied to raise the temperature above the temperature range associated with $N_2O$ generation, at which point the heating may end as indicated at 532.

FIG. 6 shows an example flow chart of method 600 for adjusting one or more engine operations to reduce $N_2O$ formation. Although FIG. 5 described reducing $N_2O$ formation by heating the catalyst using an external source, other operational adjustments are also possible. Therefore, method 600 is included to illustrate how other measures may be additionally or alternatively taken to reduce $N_2O$ formation in the exhaust system. For simplicity, method 600 generally includes modifying one or more engine operations to reduce $N_2O$ formation when the $N_2O$ formation exceeds a threshold. Then, once the $N_2O$ formation level is brought within the predetermined range, method 600 further includes operating the vehicle under the modified operating conditions. Alternatively, method 600 may further include making additional adjustments while monitoring the amount of $N_2O$ generated within the exhaust system during the engine drive cycle. Although not shown, the engine adjustments described may be made in addition to or in place of the electrical catalyst heating described with respect to FIG. 5. Moreover, one or more of the adjustments described may be made by control system 180 to reduce $N_2O$ formation into the predetermined range.

At 602, method 600 includes comparing the inferred $N_2O$ formation to the $N_2O$ threshold. Then, in response to $N_2O$ formation above the $N_2O$ threshold, at 604 method 600 includes modifying the engine operating conditions to reduce $N_2O$ formation.

As one example, method 600 includes adjusting the hybrid engine output at 610 to reduce the amount of $N_2O$ formation within the exhaust system. For instance, in response to a high $N_2O$ formation, control system 180 may reduce a power output from engine 110 while increasing a power output from motor 120. In addition, as described herein motor 120 may be controlled to substantially provide the reduction in power from engine 110. Thereafter, the hybrid engine output may be adjusted based on an amount of $N_2O$ formation until the $N_2O$ formation falls within the predetermined range.

As another example, method 600 includes adjusting fuel injection 612. Therefore, a fuel injection or combustion in the engine system may be modified based on the increased $N_2O$ level. For example, as described above, the formation of $N_2O$ in DOC 272 may result from the reaction of HC with NOx according to Reaction 4. Therefore, a reduced fuel injection may reduce the amount of HC present in the exhaust gas, which further reduces the amount of $N_2O$ since less HC is present in the exhaust gas to react with NOx according to Reaction 4.

As still another example, an exhaust gas recirculation (EGR) may be increased to reduce the amount of $N_2O$ formation. Therefore, at 614, the engine modification includes increasing recirculation of exhaust gases into combustion chambers of the engine to lower a combustion temperature and thereby reducing the NOx formation therefrom.

As yet another example, where appropriate, method 600 includes switching a fuel supply (e.g., diesel fuel) to a second fuel (e.g., methane or CNG) having less carbon content at 616. Therefore, when a portion of a first fuel delivered to the engine is reduced, the second fuel having less carbon content than the first fuel may be added to the engine to offset the power loss while also reducing the hydrocarbon content of the exhaust system, which results in a reduction in the $N_2O$ formation via Reaction 4.

Still further, at 618, method 600 includes increasing an effective compression ratio of the engine to reduce HC and $N_2O$ formation therein. For example, increasing an engine compression ratio may comprise making at least one of the following adjustments: changing intake valve timing of the engine, increasing pressure of air forced into the engine, or decreasing a volume of combustion chambers of the engine. As such, controller 180 may be configured to make one or more of these adjustments in order to increase a compression ratio in the engine. Method 600 further includes making one or more of the adjustments described above to modify engine operations and reduce the amount of $N_2O$ generated therein. Further, one or more of these adjustments may be made when DOC 272 is within the $N_2O$ formation window (e.g., ~175-350° C.) to reduce the amount of $N_2O$ generated.

To illustrate modification of engine operations according to method 600, FIG. 7 shows an example flow chart of method 700 for modifying engine operations in response to an example high HC/NOx ratio. At 702, method 700 includes monitoring the exhaust conditions to determine when conditions are favorable for $N_2O$ formation. For example, as described above, sensor 226 may be used to monitor the exhaust gas composition within exhaust passage 248 upstream of emissions control system 270.

At 704, method 700 includes comparing an HC/NOx ratio to a ratio threshold used to indicate a high $N_2O$ formation. Then, if the ratio exceeds the ratio threshold, for instance, because a fuel injection and hydrocarbon content of the exhaust is high, at 710, method 700 includes monitoring the temperature of the catalyst, e.g., DOC 272, to determine whether the catalyst is in an $N_2O$ formation window that indicates whether $N_2O$ may be generated therein. Alternatively, if the HC/NOx ratio falls below the ratio threshold, at 706, control system 180 may be programmed to determine that $N_2O$ formation within the exhaust system falls within the predetermined range and therefore continue vehicle operations without making substantial modifications.

Returning to 710, if the catalyst temperature falls below a temperature threshold while the HC/NOx ratio is above the ratio threshold, the conditions in DOC 272 may be favorable for $N_2O$ generation. As a first measure, method 700 may include heating DOC 272 to raise the catalyst temperature above a temperature range associated with $N_2O$ generation. As such, the method proceeds to 712 and supplies a current to DOC heater 302 to increase the temperature of the catalyst out of the $N_2O$ formation window. Then, at 714, control system 180 may regulate the amount of heat supplied to the electrical heater based on the HC/NOx ratio detected, which indicates the amount of $N_2O$ generated within DOC 272.

Alternatively, if the catalyst temperature exceeds the temperature threshold while the HC/NOx ratio is high, $N_2O$ may still be generated within the exhaust system even though the catalyst is above a temperature range associated with $N_2O$ generation. As such, other operational adjustments may be performed as described with respect to FIG. 6. FIG. 7 exemplifies the method for a hybrid vehicle by adjusting the hybrid engine output to prevent $N_2O$ formation within the exhaust system. At 720, method 700 includes preventing a current from being supplied to DOC 272, for instance, because the catalyst temperature already exceeds the temperature threshold and is therefore outside of the $N_2O$ formation window. Although method 700 prevents the current from being supplied to DOC 272, in other embodiments, the amount of current supplied to DOC 272 may instead be regulated, for example, to maintain a catalyst temperature based on engine operating conditions. Then, at 722, method 700 further includes reducing power from engine 110 and increasing power to motor 120 in the manner already described. At 724, method 700 includes adjusting the hybrid engine output based on the detected HC/NOx level. Although method 700 includes making adjustments based on a HC/NOx level, in other embodiments, the method may alternatively or additionally make adjustments to reduce an $N_2O$ level in response to an $NO_2/NOx$ level instead.

The methods described are further applicable based on inferring a total amount of $N_2O$ emissions generated within the exhaust system. Therefore, the methods may make one or more adjustments based on, for example, estimating the amount of $N_2O$ released to the atmosphere at the exhaust outlet in addition to inferring the $N_2O$ formation at one or more catalysts.

As such, FIG. 8 shows an example flow chart of method 800 for reducing $N_2O$ emissions by making one or more adjustments in response to $N_2O$ emissions in excess of a preselected amount. For this reason, at 802, method 800 includes estimating and/or inferring a total $N_2O$ concentration present at the exhaust outlet. Alternatively, in some embodiments, the $N_2O$ amount out of SCR 274 or at a point downstream of SCR 274 may be used instead.

At 810, method 800 includes comparing the inferred amount of $N_2O$ emitted from the exhaust system to a threshold. Then, if the $N_2O$ emissions exceed the threshold, method 800 proceeds to 812 and identifies that the $N_2O$ emissions are outside of the predetermined range. In response to the high $N_2O$ emissions, one or more engine operations may be adjusted to reduce the $N_2O$ emissions below the threshold and thereby to reduce the amount of $N_2O$ generated within the exhaust system. Alternatively, if the $N_2O$ emissions fall below the threshold, method 800 proceeds to 814 by identifying that the $N_2O$ emissions fall within the predetermined range. When $N_2O$ vehicle emissions are within the predetermined range, vehicle operations may continue based on a load of the engine.

Turning briefly to FIG. 9, which shows a graphical representation of the pre-determined range relative to the regulated cap, the pre-determined range is described in greater detail. As shown, the threshold indicating the upper end of predetermined range 902 may be set to indicate a high level of $N_2O$ emissions that remain below the cap regulated by the U.S. E.P.A. In particular, recent rulemaking by the U.S. E.P.A. has set a cap for $N_2O$ emissions based on vehicle chassis. For example, a chassis certified light-duty vehicle is capped at 10 mg/mi whereas a medium-duty vehicle is capped at 50 mg/mi. For emissions occurring above the cap, the U.S. E.P.A. further mandates a penalty be reported. As such, according to the present disclosure, when $N_2O$ emissions fall outside of predetermined range 902, for example, because a high $N_2O$ formation is present within the vehicle, intrusive actions may be taken to reduce the $N_2O$ emissions prior to the $N_2O$ emissions exceeding the regulated cap. As one example in particular, as a first measure, a catalyst may be heated to increase the catalyst temperature above a temperature range associated with $N_2O$ generation. Then, more drastic measures or engine modifications may be taken to more aggressively reduce the amount of $N_2O$ generated when the $N_2O$ generation exceeds the regulated cap.

Returning to FIG. 8, at 820, method 800 includes comparing the inferred total $N_2O$ emissions to the regulated cap. Then, if the inferred total $N_2O$ level is above the regulated cap, method 800 includes modifying engine operations to reduce $N_2O$ formation at 822. In FIG. 8, the engine modification includes adjusting the hybrid engine output, although other operational modifications are also possible (e.g., adjusting a fuel injection, increasing an EGR, and/or switching the fuel supply to a second fuel having less carbon content). In response to $N_2O$ emissions exceeding the regulated cap, at 824, the power output of the engine may be reduced while the electric motor is controlled to substantially provide the reduction in power from the engine. Then, at 826, method 800 includes adjusting the hybrid engine output based on the detected $N_2O$ emissions until the emissions are brought below the regulated cap. Although not shown explicitly, the method may also or alternatively include simultaneously heating one or more catalysts to aid in reducing $N_2O$ emissions.

If, at 820, the $N_2O$ emissions do not exceed the regulated threshold, and therefore fall below the regulated cap while also falling outside of the pre-determined range, the $N_2O$ generation may instead fall within the catalyst heating range 904 indicated in FIG. 9. Thereby, the $N_2O$ emissions may fall below the regulated cap while still being outside of predetermined range 902, and method 800 may proceed to 830 by heating one or more catalysts using an external source to reduce $N_2O$ formation to counteract the increased levels of $N_2O$. For example, at 830, control system 180 may increase the current supplied to DOC 272 based on the inferred total level of $N_2O$. Then, at 832, method 800 may further include regulating the amount of current supplied, and therefore control the rate of heating based on the $N_2O$ formation within the exhaust system. As such, FIG. 9 further shows an example catalyst heating scale 920 to graphically illustrate how much heat is added based on the inferred level of $N_2O$ emissions compared to the regulated cap. That is, if the $N_2O$ emissions fall outside of the predetermined range by a substantially small amount as shown at 922, the electrical heating may occur more slowly depending on the power usage requested by a vehicle operator. Alternatively, if the $N_2O$ emissions are nearing the level of the regulated cap, and therefore fall outside of the predetermined range by a substantially large amount as shown at 924, the electrical heating may occur more rapidly by increasing the amount of current supplied to the electrical heater. In other words, the amount of electrical heating may be controlled based on the inferred level of $N_2O$ emissions compared to the predetermined operating range and regulated cap.

With respect to the carbon penalty for emissions that occurs above the regulated cap, FIG. 10 shows an example flow chart of method 1000 for monitoring and/or reducing a carbon penalty during vehicle operations. At 1002, method 1000 includes estimating and/or inferring the total emissions at an exhaust outlet. In contrast to the vehicle emissions described above, which relate to the generation of $N_2O$ within the exhaust system, a carbon footprint may be estimated and/or calculated based on additional exhaust components present within the exhaust system. For example, greenhouse gases like HC, CO, NOx and $CO_2$ etc., may be used to calculate a carbon footprint in order to determine whether a penalty is to be reported. As such, at 1004, method 1000 includes calculating a carbon footprint, for example, by accounting for the contribution of each component detected within the exhaust gas to the overall environmental impact. As mentioned above, $N_2O$ is of concern because excess amounts of $N_2O$ may have a global warming potential that is approximately 298 times that of $CO_2$ on a mass basis. For this reason, excess $N_2O$ is transformed into a carbon dioxide equivalence by adding a multiple of the excess $N_2O$ to the estimated $CO_2$ emitted from the exhaust system. For example, the amount of excess $N_2O$ is multiplied by a factor of 300 to estimate its impact on carbon dioxide emissions based on the global warming potential of $N_2O$.

At 1010, method 1000 thus includes inferring the amount of $N_2O$ emitted from the exhaust to determine whether it exceeds the regulated cap. Then, if the $N_2O$ generated within the exhaust system exceeds the regulated cap, at 1012, the $N_2O$ penalty due to the excess $N_2O$ may be calculated based on the difference between the inferred $N_2O$ level and the regulated cap. Said difference may be converted to a $CO_2$ equivalence at 1014, wherein the $CO_2$ equivalence is calculated by multiplying the $N_2O$ penalty by the multiplicative factor, which is 300 for $N_2O$. At 1016, method 1000 optionally includes recalculating the carbon footprint including the $N_2O$ penalty and comparing the recalculated footprint to the previously calculated footprint to determine whether a potential $CO_2$ penalty from $N_2O$ emissions may be severe enough to warrant the taking of intrusive actions to reduce the amount of $N_2O$ generated. Then, method 1000 further includes reducing the $N_2O$ emissions by, for instance, making one or more operational adjustments as described above with respect to FIGS. 4-9. If $N_2O$ emissions are to be reduced, at 1022, control system 180 may reduce an $N_2O$ amount generated by making the one or more operational adjustments (e.g., heating a catalyst) and calculating the carbon footprint to determine whether a reduction in the carbon footprint and $N_2O$ emissions has occurred in response to the intrusive action. If, at 1020, no intrusive interactions are taken to reduce $N_2O$ emissions, method 1000 proceeds to 1032 and calculates the total $CO_2$ penalty based on the $N_2O$ penalty and other exhaust gas levels present in the exhaust system. At 1034, method 1000 further includes reporting the total $CO_2$ penalty to a regulatory agency as mandated by the U.S. E.P.A.

Returning to 1010, if the concentration of $N_2O$ falls below the regulated cap, method 1000 may proceed to 1030 to determine whether the carbon footprint is above the regulated carbon cap. If the carbon footprint exceeds the carbon cap, method 1000 proceeds directly to calculate a $CO_2$ penalty at 1032. Although a simple form of method 1000 is shown in FIG. 10 for brevity, it is to be understood that one or more operational adjustments may also be made to reduce the amount of emissions from other gaseous chemicals present in the exhaust system other than $N_2O$ in order to decrease the carbon footprint below the regulated cap. As such, the hybrid motor output may also be adjusted in the manner described above in order to reduce one or more emissions from the vehicle exhaust system in addition to $N_2O$. In this way, the method further includes intrusive actions to reduce one or more emissions from being emitted from the vehicle. If a $CO_2$ penalty is accepted because the carbon footprint exceeds a carbon cap, at 1034, the method may further include reporting the $CO_2$ penalty to one or more regulatory agencies as mandated by the U.S. E.P.A. Alternatively, if at 1030 the carbon footprint falls below the carbon cap while the $N_2O$ level also falls below the regulated cap, vehicle operation may continue while the exhaust system is monitored by one or more of the methods described.

In this way, an oxidation catalyst can be heated using an external source such as an electrical heater to reduce the amount of $N_2O$ generated within the exhaust system. More specifically, the amount of heat supplied to the DOC may be increased to increase the catalyst temperature above a temperature range associated with $N_2O$ generation. In addition, other engine adjustments may be made in combination with the heating of the catalyst using the external source or in place of the electrical heating to further reduce the amount of $N_2O$ formed within the exhaust system.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling engine emissions, comprising:
   routing exhaust gases from the engine through an oxidation catalyst which includes a washcoat with palladium or platinum or both;
   inferring $N_2O$ formation from said catalyst from one or more of, catalyst temperature, HC to NOx ratio or $NO_2$ to NOx ratio in said engine exhaust gases; and
   reducing said $N_2O$ formation when said catalyst is operating within a temperature range associated with $N_2O$ formation.

2. The method recited in claim 1 wherein said reducing $N_2O$ formation comprises heating said catalyst from an external source to reduce said $N_2O$ formation.

3. The method recited in claim 2 wherein said heating said catalyst comprises electrically heating said catalyst and ending said heating when said catalyst temperature rises above a temperature range associated with $N_2O$ generation.

4. The method recited in claim 1 wherein said oxidation catalyst further includes a cordierite substrate, a metallic substrate, or a zeolite substrate.

5. The method recited in claim 1 wherein the engine comprises a diesel engine.

6. The method recited in claim 1 wherein said reducing $N_2O$ formation comprises increasing an effective compression ratio of the engine to reduce HC formation by the engine when said inferred $N_2O$ formation exceeds a predetermined value.

7. The method recited in claim 6 wherein said engine compression ratio increase comprises at least one of the following: changing intake valve timing of the engine, increasing pressure of air forced into the engine, or decreasing volume of combustion chambers of the engine.

8. A method for controlling emissions for a diesel engine, comprising:
routing exhaust gases from the engine through an oxidation catalyst which includes a washcoat with palladium or platinum or both;
routing exhaust gases from said oxidation catalyst into a selective reduction catalyst;
adding ammonia to said selective reduction catalyst under predetermined conditions to reduce NOx;
inferring $N_2O$ formation from said oxidation catalyst from, temperature of said catalyst, HC and NOx and $NO_2$ in said engine exhaust gases;
inferring $N_2O$ out of said selective reduction catalyst from temperature of said selective reduction catalyst, said inferred $N_2O$ formation from said oxidation catalyst, and said ammonia; and
heating said oxidation catalyst from an external source to reduce said $N_2O$ out of said selective reduction catalyst when said oxidation catalyst temperature is below a predetermined range and said $N_2O$ out of said selective reduction catalyst exceeds a preselected amount.

9. The method recited in claim 8 wherein said inferred $N_2O$ from said oxidation catalyst is inferred from temperature of said oxidation catalyst, and the ratio of HC to NOx and the ratio of $NO_2$ to NOx in said exhaust gases.

10. The method recited in claim 8 wherein said external heat source comprises an electric heater.

11. The method recited in claim 8 wherein said external heat source comprises a heat pump.

12. The method recited in claim 8 wherein engine combustion is modified when said inferred $N_2O$ formation exceeds a predetermined value to reduce formation of NOx.

13. The method recited in claim 12 wherein said engine modification includes increasing recirculation of said exhaust gases into combustion chambers of the engine to lower combustion temperatures and reduce NOx formation.

14. A method for controlling emissions for a diesel engine in a hybrid vehicle driven by either the diesel engine or an electric motor, comprising:
routing exhaust gases from the engine through an oxidation catalyst which includes a washcoat with palladium or platinum or both;
routing exhaust gases from said oxidation catalyst into a selective reduction catalyst;
adding ammonia to said selective reduction catalyst under predetermined conditions to reduce NOx;
inferring $N_2O$ formation from said oxidation catalyst from, temperature of said catalyst, ratio of HC to NOx and $NO_2$ in said engine exhaust gases;
inferring $N_2O$ out of said selective reduction catalyst from temperature of said selective reduction catalyst, said inferred $N_2O$ formation from said oxidation catalyst, NOx from the diesel engine, and said ammonia;
heating said oxidation catalyst with an electric heater to reduce said $N_2O$ formation from said oxidation catalyst when said oxidation catalyst temperature is below a predetermined range and said inferred $N_2O$ out of said selective reduction catalyst exceeds a preselected amount; and
discontinuing said electric heating when said oxidation catalyst temperature exceeds said predetermined range.

15. The method recited in claim 14 wherein power output of the diesel engine is reduced when said inferred $N_2O$ out of said selective reduction catalyst is above a predetermined value.

16. The method recited in claim 15 wherein the electric motor is controlled to substantially provide said reduction in power from the diesel engine.

17. The method recited in claim 14 wherein a portion of diesel fuel delivered to the engine is reduced when said inferred $N_2O$ out of said selective reduction catalyst is above a predetermined value and a second fuel having less carbon content than diesel fuel is added to the diesel engine to offset power loss which would otherwise occur from the diesel engine by said reduction in diesel fuel.

18. The method recited in claim 14 wherein combustion in the diesel engine is modified when said inferred $N_2O$ out of said selective reduction catalyst exceeds a predetermined value.

19. The method recited in claim 14 wherein said combustion modification includes increasing recirculation of said exhaust gases into combustion chambers of the diesel engine to lower combustion temperatures and reduce NOx formation.

20. The method recited in claim 14 further comprising estimating $CO_2$ produced from the diesel engine and adding a multiple of said inferred $N_2O$ of said selective reduction catalyst to said $CO_2$ estimation.

\* \* \* \* \*